Patented Oct. 9, 1951

2,570,601

UNITED STATES PATENT OFFICE 2,570,601

PRODUCTION OF RESINS FROM BUTADIENE MONOXIDE AND FROM MIXTURES OF BUTADIENE MONOXIDE AND VINYL COMPOUNDS

Louis Schmerling, Riverside, Ill., assignor to Universal Oil Products Company, Chicago, Ill., a corporation of Delaware No Drawing. Application November 13, 1950,
Serial No. 195,463

4 Claims. (Cl. 260—2)

This application is a continuation-in-part of my copending application Serial Number 632,288, filed December 1, 1945, and now abandoned.

This invention relates to a process for producing plastics and resins. More particularly, it relates to the formation of a resin by the thermal treatment of a reaction mixture containing butadiene monoxide.

An object of this invention is to polymerize butadiene monoxide to form a resin.

Another object of this invention is to form a resin by thermally copolymerizing butadiene monoxide and a vinyl compound.

One specific embodiment of this invention relates to a process which comprises thermally treating butadiene monoxide at a temperature of from about 150° to about 350° C. to form a resin.

Another embodiment of this invention relates to a process which comprises thermally treating butadiene monoxide at a temperature of from about 150° to about 350° C. in the presence of a vinyl compound selected from the group consisting of vinyl chloride, vinyl acetate, acrylonitrile, butadiene, and styrene.

Butadiene monoxide, or 3,4-epoxy-1-butene, utilized in the process of this invention is an organic compound containing one oxygen atom and one double bond per molecule and having the formula:

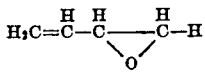

Vinyl compounds which may be copolymerized with butadiene monoxide include particularly vinyl chloride, vinyl acetate, acrylonitrile, butadiene, and styrene.

My process for producing a resin is carried out by treating butadiene monoxide at a temperature of from about 150° to about 350° C. to effect polymerization. Butadiene monoxide polymerizes with itself to form a hard, clear yellow resin, but it is sometimes desirable to copolymerize butadiene monoxide with another vinyl compound selected from the group consisting of vinyl chloride, vinyl acetate, acrylonitrile, butadiene, styrene and alpha-methylstyrene, particularly since these vinyl compounds are generally less expensive than the butadiene monoxide. Also, the mixed polymer or copolymer resins so formed have some more desirable properties for certain purposes than does the resin formed from substantially pure butadiene monoxide. These different resins have low solubilities in organic solvents, particularly hydrocarbons and accordingly are useful as surface coatings which are melted and applied hot to the materials and articles to be coated.

My process may be carried out in either batch or continuous types of operation, the latter generally being preferable. An autoclave is utilizable in batch type polymerization runs for producing my resins, while the continuous type of treatment may utilize a tubular reactor, which may or may not contain a layer of a granular solid packing material such as crushed porcelain, silica, firebrick, etc., or the reactor may be provided with baffles or other mixing equipment. The reaction mixture is then directed to suitable separating means in which unconverted starting materials are separated from the desired reaction product and the former are recycled to the process.

The resins formed in this process are useful as surface coating agents for metals, wood, paper, etc. These resins may also be molded into finished articles including flat plates or sheets, toys, plastic-type dishes and the like. These resins may also be mixed with wood flour, diatomaceous earth and other solid diluents or spacing agents and the resultant mixtures may then be formed into various articles of manufacture. Some of the resinous materials of lower molecular weight which have the consistency of viscous liquids may be employed as plasticizers for other resins and plastics.

The following examples are given of results obtained in this process, although these data are not to be considered as limiting unduly the broad scope of the invention.

Example I 25 grams of butadiene monoxide was sealed into a glass tube which was then inserted in a steel autoclave and heated therein at 250° C. for 2 hours. After the autoclave and its contents had cooled to about 25° C., the reaction mixture was removed therefrom and separated into a hard, yellow resin and a smaller amount of a viscous yellow liquid. The resin so obtained was insoluble in higher hydrocarbons. It was thermoplastic and could be molded into useful articles.

Example II

A mixture of 50 grams of butadiene monoxide and 15 grams of alpha-methylstyrene in a sealed tube was heated at 250° C. for four hours. The product was a brittle clear amber thermoplastic resin which could be drawn into threads while hot, and also could be molded.

I claim as my invention:

1. A process for producing a resin which comprises heating 3,4-epoxy-1-butene and a vinyl compound at a temperature of from about 150° to about 350° C.

2. A resin formed by heating 3,4-epoxy-1-butene and a vinyl compound at a temperature of from about 150° to about 350° C.

3. A process for producing a resin which comprises heating 3,4-epoxy-1-butene at a temperature of from about 150° to about 350° C.

4. A resin formed by heating 3,4-epoxy-1-butene at a temperature of from about 150° to about 350° C.

LOUIS SCHMERLING.

REFERENCES CITED

The following references are of record in the file of this patent:

UNITED STATES PATENTS

| Number | Name | Date |
| --- | --- | --- |
| 2,306,924 | Zerweck | Dec. 29, 1942 |
| 2,471,577 | Moffett | May 31, 1949 |

OTHER REFERENCES

Pummerer et al.: Berichte, 66B, pp. 335–339 (1933).